(12) United States Patent
Park

(10) Patent No.: US 8,556,333 B2
(45) Date of Patent: Oct. 15, 2013

(54) SUNROOF STRUCTURE FOR VEHICLE

(75) Inventor: Jeong Hoon Park, Hwaseong-si (KR)

(73) Assignees: Hyundai Motor Company, Seoul (KR); Kia Motors Corp., Seoul (KR)

(*) Notice: Subject to any disclaimer, the term of this patent is extended or adjusted under 35 U.S.C. 154(b) by 0 days.

(21) Appl. No.: 13/524,567

(22) Filed: Jun. 15, 2012

(65) Prior Publication Data

US 2013/0154313 A1    Jun. 20, 2013

(51) Int. Cl.
*B60J 7/00* (2006.01)
(52) U.S. Cl.
USPC ............ 296/187.01; 296/901.01; 296/216.01
(58) Field of Classification Search
USPC ................ 296/216.01–224, 187.01, 901.01
See application file for complete search history.

(56) References Cited

U.S. PATENT DOCUMENTS

| 4,553,307 A | * | 11/1985 | Kaltz et al. ................. 29/434 |
| 4,728,146 A | * | 3/1988 | Srdinko ................. 296/216.06 |
| 7,077,462 B1 | * | 7/2006 | De Gaillard ............ 296/216.01 |

FOREIGN PATENT DOCUMENTS

| CA | 2243621 | * | 1/2000 |
| JP | 2008-247059 A | | 10/2008 |
| KR | 10-2009-0020801 A | | 2/2009 |
| KR | 10-2009-012696 A | | 12/2009 |

* cited by examiner

*Primary Examiner* — Dennis Pedder
(74) *Attorney, Agent, or Firm* — Morgan, Lewis & Bockius LLP

(57) ABSTRACT

A sunroof structure for a vehicle may include a mounting frame made of plastic material, and an insert plate inserted into a front upper side of the mounting frame, forming an upper exposed surface of the vehicle.

6 Claims, 5 Drawing Sheets

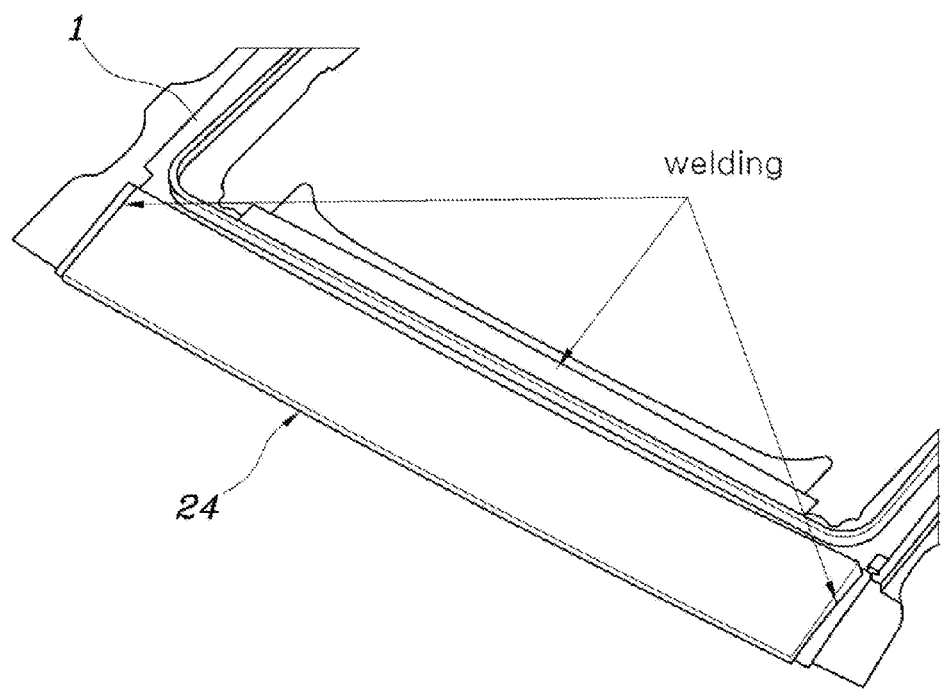

SUNROOF STRUCTURE FOR VEHICLE

CROSS-REFERENCE TO RELATED APPLICATIONS

The present application claims priority to Korean Patent Application No. 10-2011-0134234 filed on Dec. 14, 2011, the entire contents of which is incorporated herein for all purposes by this reference.

BACKGROUND OF THE INVENTION

1. Field of the Invention

The present invention relates, in general, to a sunroof structure for a vehicle and, more particularly, to a sunroof frame structure for a vehicle which is adaptable to a panorama sunroof.

2. Description of Related Art

FIG. 1 shows a vehicle in which a conventional panorama sunroof is installed which includes 3 pieces of a front stationary glass member 504, a middle movable glass member 502 that is opened and closed by performing a sliding movement, and a rear stationary glass member 500.

Here, the front stationary glass member 504 is so opaque that light is not transmitted, and is fixed to a mounting frame. The front glass member forms a unified appearance together with the movable glass member 502 and the rear glass member 500 to improve the external appearance.

However, since the front glass member 504 is heavy and is fixed to the front side of the mounting frame, if the mounting frame is made of plastic material, sagging occurs and causes wind noise or the front glass member 504 to break. Further, also if the mounting frame is made of steel, the weight of the sunroof structure is excessively increased, making it difficult to sufficiently provide torsion strength and thereby possibly causing durability problems such as the front glass member 504 cracking at the corners.

Since the front glass member 504 is essentially formed of heavy-weight glass material, the fuel efficiency of a vehicle is reduced. Further, since the front glass member 504 is separately fixed to the mounting frame, there is less assembly required for a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sunroof structure for a vehicle in which a front stationary glass member is not used to basically prevent glass from being broken as well as a mounting frame from sagging or becoming deformed, thereby improving the durability and fuel efficiency of a vehicle owing to the weight reduction while obtaining a unified external appearance of a panorama sunroof.

In an aspect of the present invention, a sunroof structure for a vehicle may include a mounting frame made of plastic material, and an insert plate inserted into a front upper side of the mounting frame, forming an upper exposed surface of the vehicle.

The mounting frame may have a plurality of support ribs which protrude in a vertical direction toward a lower side of the insert plate so as to support the insert plate.

The insert plate may include a body part which is formed into an elongated plane so that an upper side thereof is exposed to the outside, forming an external appearance of the vehicle, and wing parts which extend backwards from opposite ends of the body part such that an upper side thereof is covered by the mounting frame in such a manner that a portion, at least, of the upper side and a lower side thereof all are surrounded by the mounting frame.

The wing parts of the insert plate are provided with a plurality of support through-holes, and the mounting frame is provided with a plurality of support portions each passing through the corresponding support through-holes to surround and support the upper and lower sides of the wing part.

The insert plate is made of metal material, and the upper side of the body part is coated with a glossy coating surface.

The body part of the insert plate is provided in a front lower side thereof with a gate groove that forms a gate through which resin forming the mounting frame is introduced.

The insert plate is integrally provided with a plurality of weld bolts which extend downwards to fix the mounting frame to a vehicle body below the insert plate.

A mounting boss is formed on a lower side of the mounting frame where the weld bolt is located, such that the mounting boss surrounds the weld bolt and protrudes downwards from the lower side of the mounting frame, the mounting boss serving to restrict a fastening length of the weld bolts.

In another aspect of the present invention, a sunroof structure for a vehicle may include a mounting frame made of metal material, and a coated panel made of metal material and engaged on a front upper side of the mounting frame, while forming a glossy coating surface on the upper side thereof.

The coated panel is welded to the mounting frame at opposite ends and rear side of the mounting frame, and the coating surface is black in color.

As previously set forth, according to an exemplary embodiment of the present invention, a front stationary glass member is not used to basically prevent glass from being broken as well as a mounting frame from sagging or becoming deformed, thereby improving durability and fuel efficiency of a vehicle owing to the weight reduction while obtaining a unified external appearance of a panorama sunroof.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 10 is a view showing a sunroof structure for a vehicle according to another embodiment of the present invention.

Figure 1:
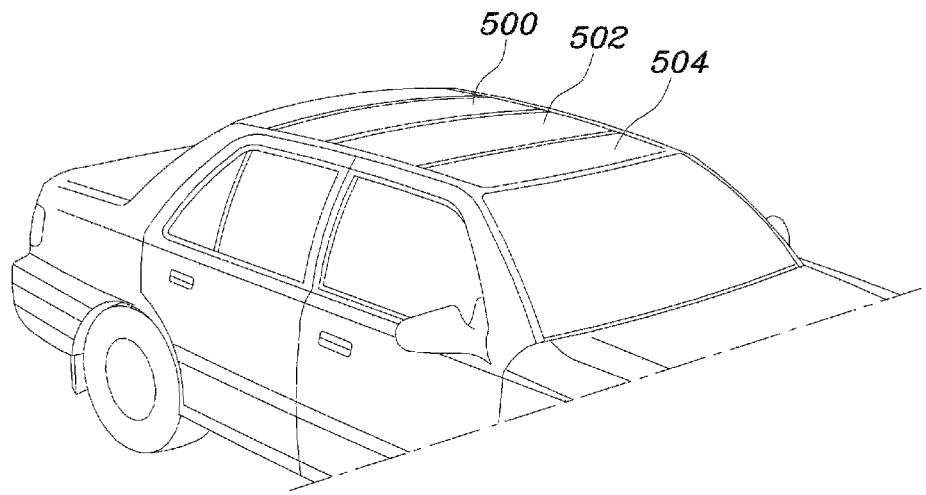
FIG. 1 is a view showing a conventional 3-piece panorama sunroof structure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 2 to 9, a sunroof structure for a vehicle according to an exemplary embodiment of the present invention includes a mounting frame 1 made of plastic material, and an insert plate 3 inserted into the front upper side of the mounting frame 1, forming an upper exposed surface.

That is, the sunroof structure uses the insert plate 3 instead of a conventional front stationary glass member, such that the insert plate 3 is integrated with the mounting frame 1 made of plastic material, thereby requiring no post-processing such as that would which impart an additional adhesion function.

The insert plate 3 includes a body part 5 which is formed into an elongated plane so that the upper side thereof is exposed to the outside and forms the external appearance, and wing parts 7 which extend backwards from opposite ends of the body part 5 such that the upper side thereof is covered by the mounting frame 1 in such a manner that a portion, at least, of the upper and lower sides thereof all are surrounded by the mounting frame 1.

The mounting frame 1 has a plurality of support ribs 9 which protrude in a vertical direction toward the lower side of the insert plate 3 so as to support the insert plate 3.

Since the shape of the body part 5 of the insert plate 3 is planar, in order to secure sufficient stiffness and rigidity of the shape when the insert plate is coupled to the mounting frame, the mounting frame 1 is provided with the plurality of support ribs 9 to support the lower side of the insert plate 3.

The wing part 7 of the insert plate 3 is provided with a plurality of support through-holes 11, and the mounting frame 1 is provided with a plurality of support portions 13 each passing through the support through-hole 11 to surround and support the upper and lower sides of the wing part 7.

The central body part 5 of the insert plate 3 is exposed to the outside and forms a portion of the upper side of a vehicle body, so that plastic resin constituting the mounting frame 1 can be integrally formed only on the lower side of the insert plate. The wing part 7 is provided with the support through-holes 11 engaged to the support portions 13 in order to secure the stability of assembly between the insert plate 3 and the mounting frame 1.

In the meantime, the insert plate 3 is made of metal material, and the upper side of the body part 5 is preferably coated with a glossy coating surface 15. Here, since it is common for glass members forming the panorama sunroof to have a black color when viewed from outside, the coating surface 15 preferably has a black color in order to secure identity in appearance with the glass members.

Figure 2:
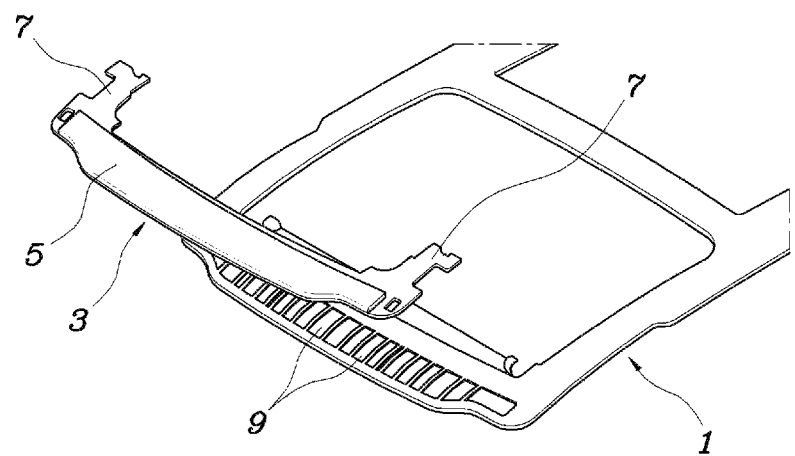
FIG. 2 is an exploded perspective view showing a sunroof structure for a vehicle according to an exemplary embodiment of the present invention.
Figure 3:
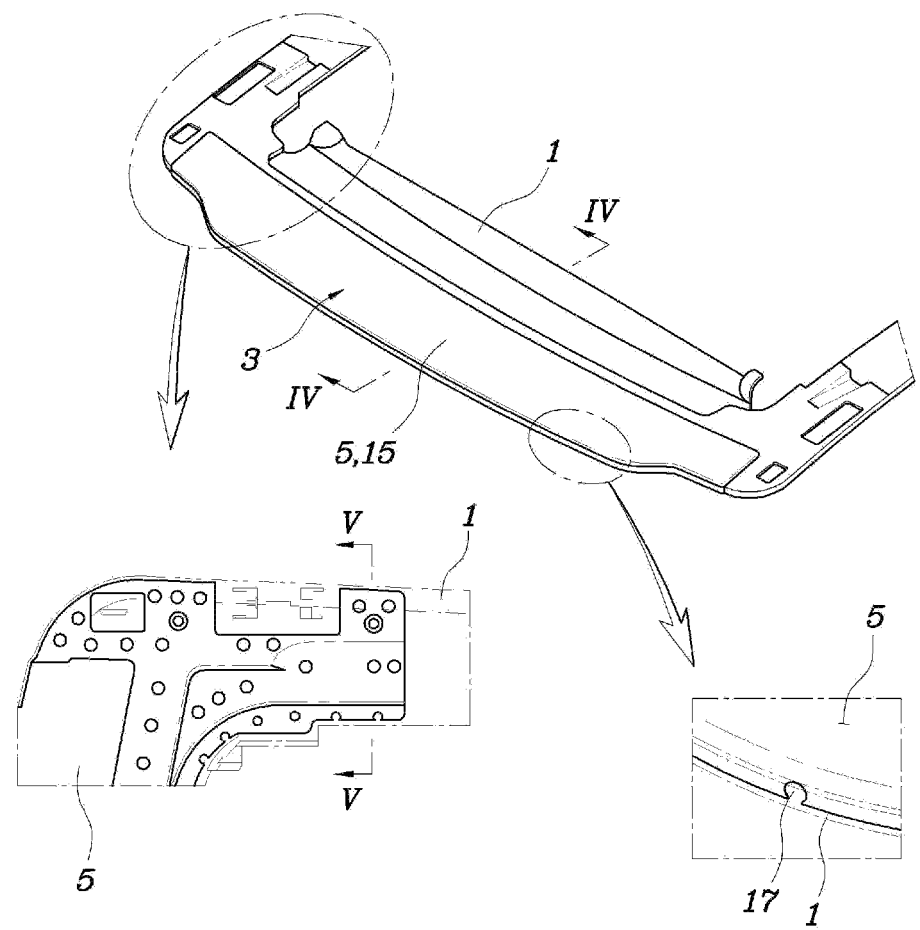
FIG. 3 is a view showing the state of a mounting frame and an insert plate, which are shown in FIG. 2, being assembled together.
Figure 4:
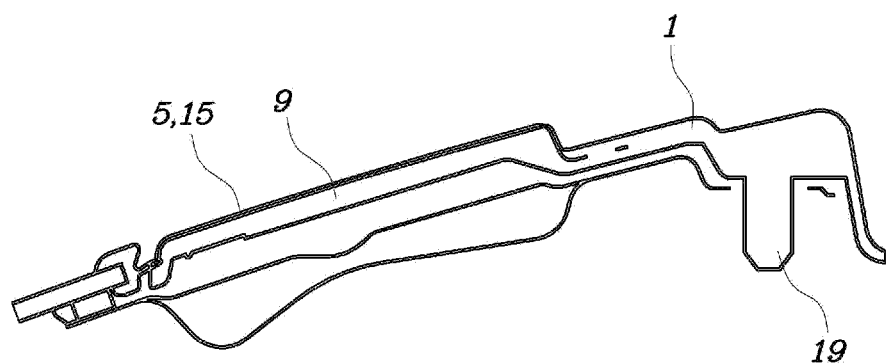
FIG. 4 is a cross-sectional view taken along line IV-IV of FIG. 3.
Figure 5:
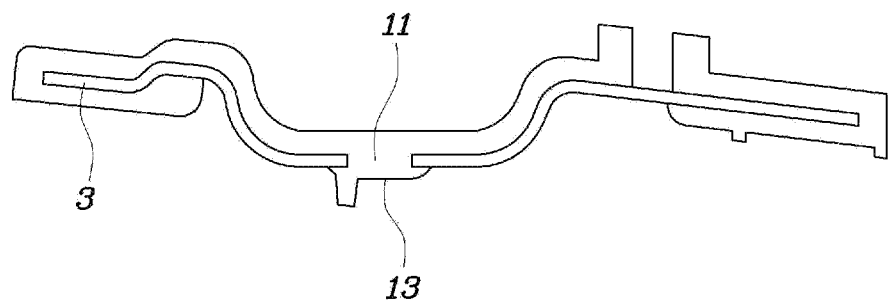
FIG. 5 is a cross-sectional view taken along line V-V of FIG. 3.
Figure 6:
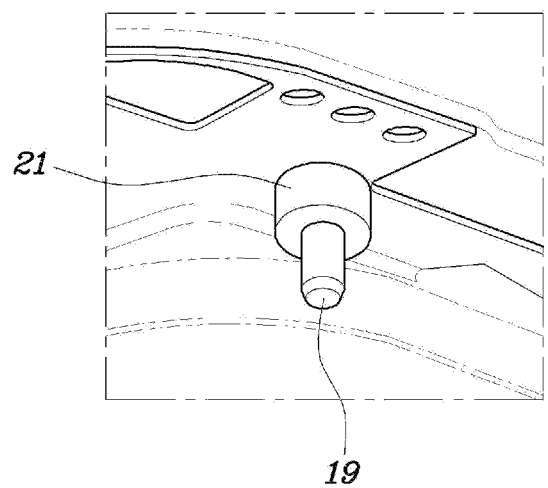
FIG. 6 is a view showing the assembly of the mounting frame and the insert plate with an attached weld bolt.
Figure 7:
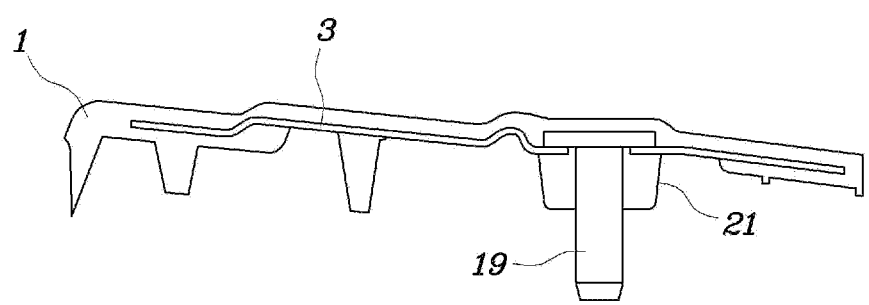
FIG. 7 is a cross-sectional view of the portion where the weld bolt is formed.
Figure 8:
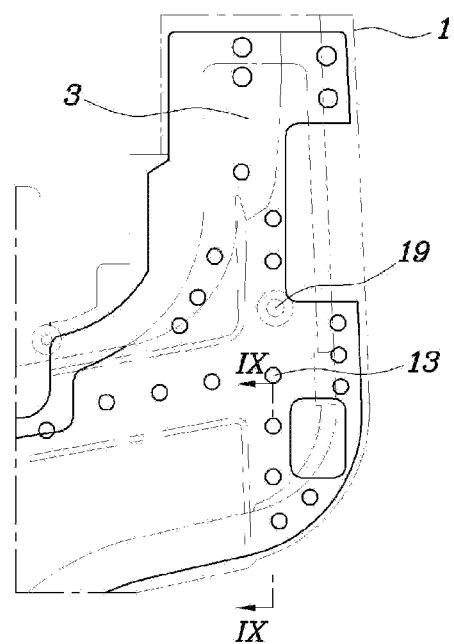
FIG. 8 is a partial view showing the lower side of the assembly of the mounting frame and the insert plate.
Figure 9:
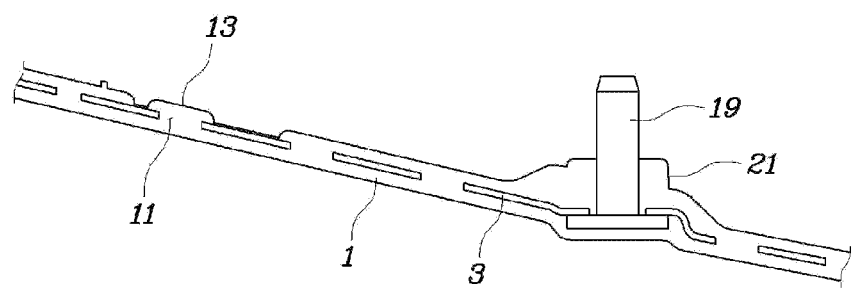
FIG. 9 is a cross-sectional view taken along line IX-IX of FIG. 8.

Referring to FIG. 2, the body part 5 of the insert plate 3 is provided in the front lower side thereof with a gate groove 17 that forms a gate through which resin forming the mounting frame is introduced. This allows that resin to be introduced when the insert plate 3 is injection-molded to the mounting frame 1. In addition, since the gate groove 17 is circularly recessed towards the lower side so that it assists in securing a vertical engaging force between the resinous portion of the mounting frame 1 and the insert plate 3, the gate groove 17 may be composed of a plurality of gate grooves.

The insert plate 3 is integrally provided with a plurality of weld bolts 19 which extend downwards to fix the mounting frame 1 to the vehicle body below the insert plate. That is, before the insert plate is insert-molded to the mounting frame 1, the weld bolts 19 have already been welded to the insert plate.

The weld bolt 19 serves as a fastening member used when the mounting frame 1 is mounted to the vehicle body.

A mounting boss 21 is preferably formed on the lower side of the mounting frame 1 where the weld bolt 19 is located, such that it surrounds the weld bolt 19 and protrudes downwards from the lower side of the mounting frame 1. The mounting boss 21 is provided to restrict the effective fastening length of the weld bolt 19, contributing to improving the assembly and making it easy to assemble the mounting frame 1 to the vehicle body.

As previously set forth, according to an exemplary embodiment of the present invention, the configuration is such that the insert plate 3 made of metal material such as steel is integrally insert-molded to the mounting frame 1 made of plastic material, and the glossy coating surface 15 of black color is formed on the upper side of the insert plate 3, so that a conventionally-used, heavy front stationary glass member can be omitted, thereby improving the fuel efficiency owing to weight-reduction, essentially eliminating problems such as the glass member breaking, and obtaining simple assembly.

In the meantime, the present invention provides a sunroof structure for a vehicle according to another embodiment as shown in FIG. 10. The sunroof includes a mounting frame 1 made of metal material, and a coated panel 24 made of metal material and engaged on the front upper side of the mounting frame 1, forming a glossy coating surface on the upper side thereof.

Unlike the former embodiment, the mounting frame 1 includes metal material instead of plastic material. Here, since it is impossible to attach the insert molding to the insert plate 3, the coated panel 24, which can replace the conventionally used front stationary glass member, is integrally engaged with the metal mounting frame 1, thereby providing a panorama sunroof structure without the front stationary glass member.

As shown in FIG. 10, the coated panel 24 is welded to the mounting frame 1 at opposite ends and rear side of the mounting frame 1, thereby making the structure of the fastening to the mounting frame 1 a strong fastening structure. The coating surface preferably has the black color because black advantageously harmonizes with the color of other sunroof glass members.

The other construction is identical to that of the former embodiment, so a detailed description thereof will be omitted.

For convenience in explanation and accurate definition in the appended claims, the terms "upper", "lower", "inner", "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sunroof structure for a vehicle comprising:
    a mounting frame made of plastic material; and
    an insert plate inserted into a front upper side of the mounting frame, forming an upper exposed surface of the vehicle;
    wherein the insert plate includes:
        a body part which is formed into an elongated plane so that an upper side of the elongated plate is exposed to the outside forming an external as appearance of the vehicle; and
        wing parts which extend backwards from opposite ends of the body part such that an upper side of the wing parts is covered by the mounting frame in such a manner that a portion, at least, of the upper side and a lower side of the wing parts all are surrounded by the mounting frame; and
    wherein the wing parts of the insert plate are provided with a plurality of support through-holes, and the mounting frame is provided with a plurality of support portions each passing through the corresponding support through-holes to surround and support the upper and lower sides of the wing part.

2. The sunroof structure for the vehicle according to claim 1, wherein the mounting frame has a plurality of support ribs which protrude in a vertical direction toward a lower side of the insert plate so as to support the insert plate.

3. The sunroof structure for the vehicle according to claim 1, wherein the insert plate is made of metal material, and the upper side of the body part is coated with a glossy coating surface.

4. A sunroof structure for a vehicle comprising:
    a mounting frame made of plastic material; and
    an insert plate inserted into a front upper side of the mounting frame, forming an upper exposed surface of the vehicle;
    wherein the insert plate includes:
        a body part which is formed into an elongated plane so that an upper side of the elongated plate is exposed to the outside forming an external appearance of the vehicle; and
        wing parts which extend backwards from opposite ends of the body part such that an upper side of the wing parts is covered by the mounting frame in such a manner that a portion, at least, of the upper side and a lower side of the wing parts all are surrounded by the mounting frame; and
    wherein the body part of the insert plate is provided in a front lower side thereof with a gate groove that forms a gate through which resin forming the mounting frame is introduced.

5. The sunroof structure for the vehicle according to claim 1, wherein the insert plate is integrally provided with a plurality of weld bolts which extend downwards to fix the mounting frame to a vehicle body below the insert plate.

6. The sunroof structure for the vehicle according to claim 5, wherein a mounting boss is formed on a lower side of the mounting frame where the weld bolt is located, such that the mounting boss surrounds the weld bolt and protrudes downwards from the lower side of the mounting frame, the mounting boss serving to restrict a fastening length of the weld bolts.

* * * * *